United States Patent [19]
Womack

[11] Patent Number: 5,258,119
[45] Date of Patent: Nov. 2, 1993

[54] FILTER ASSEMBLY WITH FILTER MEDIA RETRIEVAL

[75] Inventor: Thomas H. Womack, Novato, Calif.

[73] Assignee: Womack International, Inc., Novato, Calif.

[21] Appl. No.: 716,646

[22] Filed: Jun. 17, 1991

[51] Int. Cl.⁵ .................... B01D 25/127; B01D 25/32
[52] U.S. Cl. ................................... 210/225; 210/387; 210/396; 210/DIG. 3
[58] Field of Search ......... 210/225, 387, 396, DIG. 3; 100/198

[56] References Cited

U.S. PATENT DOCUMENTS

| | | | |
|---|---|---|---|
| 392,606 | 11/1988 | Heywood | 210/396 |
| 643,022 | 2/1900 | Wilson | 210/225 |
| 1,796,491 | 3/1931 | Sweetland | 210/396 |
| 2,016,991 | 10/1935 | Dollinger | 183/62 |
| 2,092,111 | 9/1937 | Dons et al. | 210/217 |
| 2,097,529 | 11/1937 | Nordell | 210/198 |
| 2,553,387 | 5/1951 | Slama | 210/202.5 |
| 2,581,210 | 1/1952 | Simpson | 210/211 |
| 2,665,812 | 1/1954 | Crane | 210/196 |
| 2,848,113 | 8/1958 | Paterson et al. | 210/393 |
| 2,861,688 | 11/1958 | Harms | 210/744 |
| 3,289,848 | 12/1966 | Miles | 210/391 |
| 3,499,532 | 3/1970 | Schneider | 210/225 |
| 3,812,971 | 5/1974 | Yamamoto | 210/327 |
| 4,153,557 | 5/1979 | Hori | 210/396 |
| 4,233,157 | 11/1980 | Miller | 210/387 |
| 4,274,961 | 6/1981 | Hirs | 210/225 |
| 4,289,615 | 9/1981 | Schneider et al. | 210/91 |
| 4,324,659 | 4/1982 | Titoff | 210/386 |
| 4,362,617 | 12/1982 | Klepper | 210/225 |
| 4,686,043 | 8/1987 | Yagishita et al. | 210/387 |
| 4,738,775 | 4/1988 | Schneider | 210/225 |
| 4,869,834 | 9/1989 | Hudson | 210/791 |

*Primary Examiner*—Matthew O. Savage
*Attorney, Agent, or Firm*—John A. Bucher

[57] ABSTRACT

A compact filter assembly adapted for filter media retrieval comprises an in-line arrangement of a filter stack module, a filter media supply module for introducing filter media to the filter stack module, an extractor and separator module and a rewind module for receiving and collecting the filter media from the extractor and separator module in a condition suitable for storage, reuse or disposal, the in-line modules forming a straight-line path for the filter media and the extractor and separator module including first and second roller means arranged sequentially, each reversing the direction of travel for the filter media, and a lateral conveyor means for receiving and transferring filter solids tending to be separated from the filter media by the first roller means. A second embodiment of the invention includes a similar arrangement but with the first and second roller means being arranged at an angle relative to an imaginary line perpendicular to the filter media path to form a reverse travel portion of the filter media path which is angularly offset from substantially parallel forward travel portions of the filter media path.

12 Claims, 6 Drawing Sheets

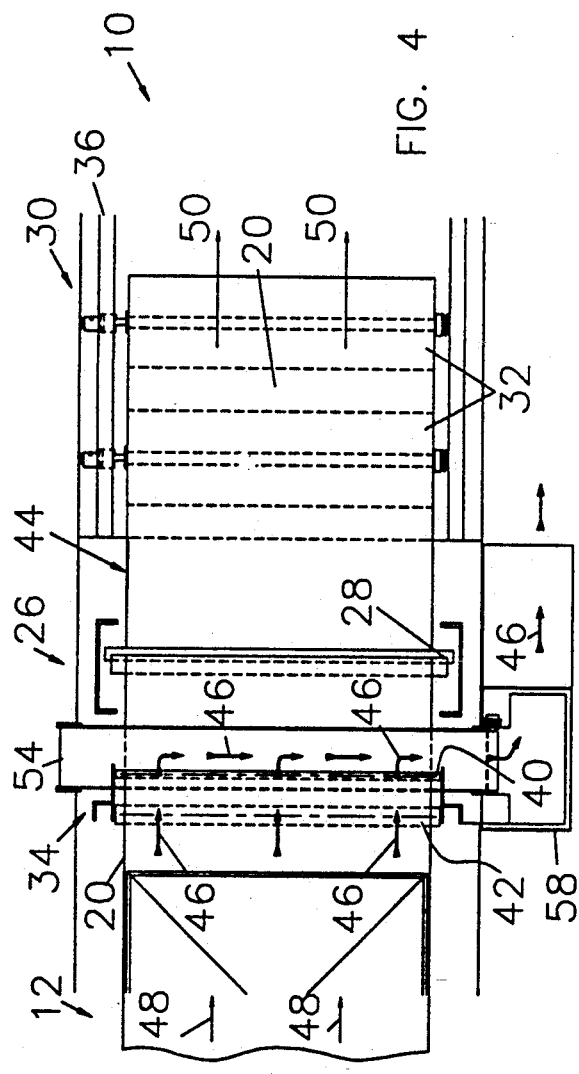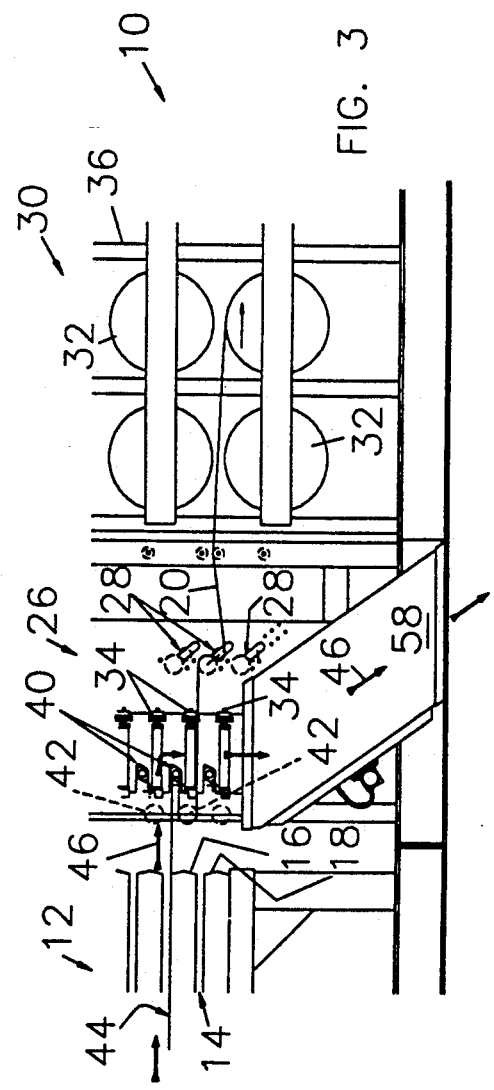

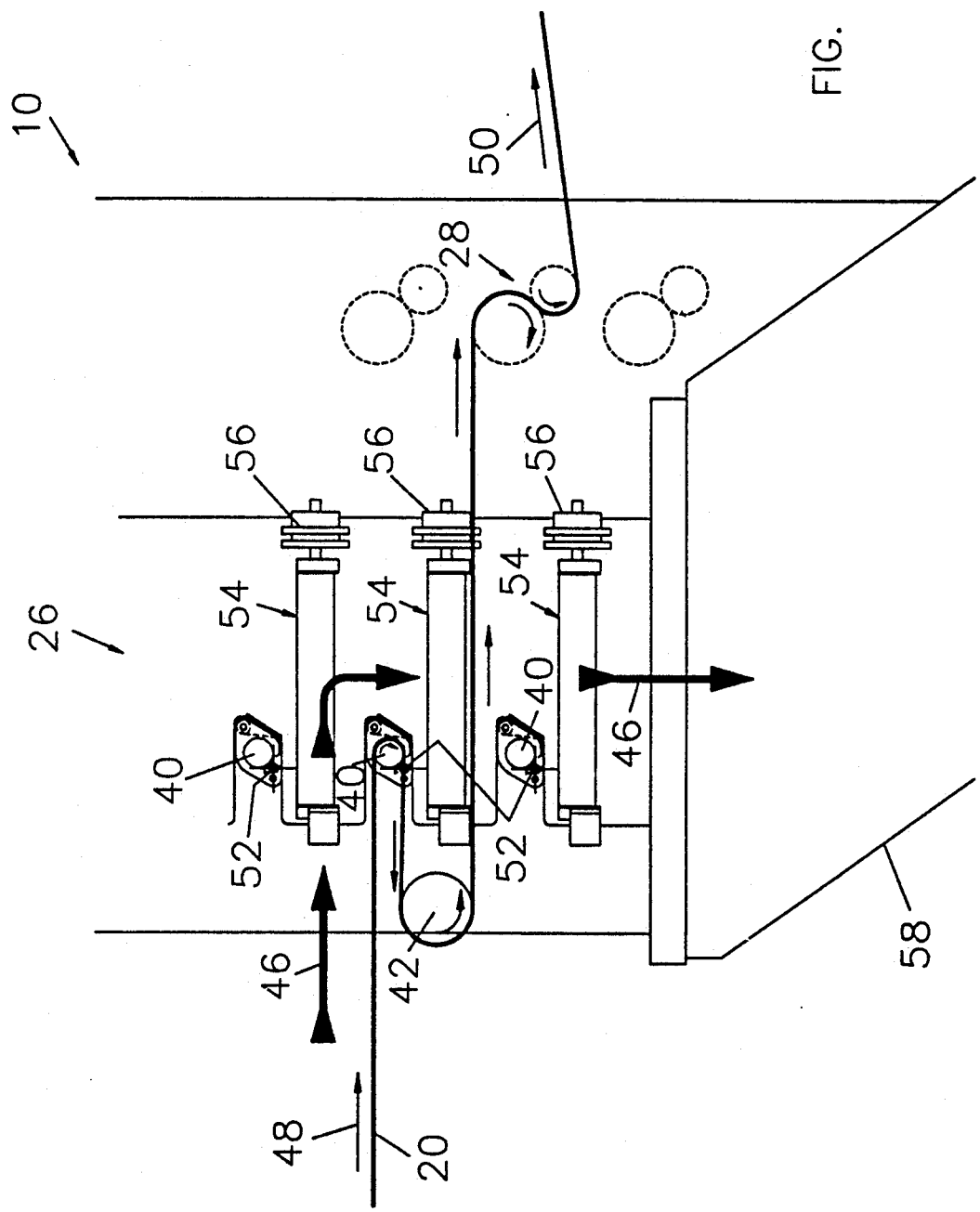

FILTER ASSEMBLY WITH FILTER MEDIA RETRIEVAL

FIELD OF THE INVENTION

The present invention relates to a filter assembly and more particularly to a filter assembly with at least one filter stack of multiple filter chambers adapted for receiving filter media and further comprising means for separating and rewinding spent filter media after use.

BACKGROUND OF THE INVENTION

A filter assembly of the type generally contemplated by the present invention is preferably adapted for pressure filtration in industrial applications while being designed to separate solid contaminants from working liquids in many different applications including, for example, metal-working coolants, food-processing liquids, chemicals and hazardous wastes.

The filter assembly typically comprises a vertical or horizontal stack of filter plates including a lower filter plate and an upper filter plate, one of which is mounted to a rigid structure or frame, called the filter press, and a variable number of intermediate filter plates, movably mounted to the fixed plate or filter press, between the upper and lower plates. The filter plates are typically large and may weigh up to several hundred pounds each. A layer of filter media, usually provided in long sheet-like rolls, is placed between each pair of filter plates. Each pair of filter plates, together with the filter media therebetween, forms dirty and clean compartments. The dirty compartment receives dirty, contaminated liquid under pressure which is thus forced through the filter media, thereby depositing the filter cake solids (contaminants with or without a filter aid) on the filter media. The resultant clean, filtered liquid enters the clean compartment of the adjacent plate.

In certain filtration applications, such as in the treatment of metal-rolling coolants and some food processes, it is necessary to remove from the liquid, contaminants as small as 0.5 microns (0.5 millionths of a meter). This level of filtration frequently requires the filter media discussed above to be supplemented with the addition of filter aids in the form of diatomaceous earth and/or Fuller's earth, or other similar products. These filter aids create a filter cake on the filter media which facilitates separation of the super-fine particles and color bodies from the liquid to further purify the working liquid in the filter assembly.

The use of filter aids is discussed herein since, when the filter aids are used, they combine with impurities from the dirty liquid to form a filter cake deposited upon the filter media. As noted above, filter assemblies of the type contemplated by the present invention are adapted for retrieval of the spent filter media and it is desirable to first separate the filter solids from the filter media. Otherwise, the use of filter aids and the manner in which they are selected and introduced into the filter system are not within the scope of the present invention and accordingly are not discussed in greater detail herein.

Filter assemblies including filter stacks with multiple filter chambers or compartments and employing filter media for separating solid contaminants from a dirty liquid have been disclosed for example in U.S. Pat. No. 4,274,961 issued Jun. 23, 1981 to Hirs; U.S. Pat. No. 4,289,615 issued Sep. 15, 1981 to Schneider, et al. and U.S. Pat. No. 4,362,617 issued Dec. 7, 1982 to Klepper.

The Schneider, et al. and Klepper references noted above also disclose and discuss representative "extractor devices" for use in filter stack assemblies.

U.S. Pat. No. 4,869,834 issued Sep. 26, 1989 to Hudson discloses yet another similar filter assembly as in the above references while also disclosing additional roller means for rewinding or collecting the spent filter media after it is extracted from the filter chambers in the filter stack assembly.

The reference noted immediately above also discussed the use of so-called "deflection edges" (or rollers for changing the filter media path of travel for the stated purpose of avoiding skewing of the filter media as it travels through the filter assembly).

The above noted references are believed representative of a relatively wide number of other prior art references disclosing generally similar filter assemblies. Accordingly, the above noted references are believed to be generally representative of the prior art.

SUMMARY OF THE INVENTION

Although the filter assemblies disclosed by the above references were found to be generally suitable for their intended purposes, there has been found to remain a need for further improvements in such filter assemblies. In particular, such further improvements have been found desirable in filter assemblies where the filter media is to be collected or rewound after use in the filter assembly. Such rewinding normally involves separation of filter cake solids from the filter media so that the filter media is in a condition suitable for storage, reuse or disposal, as necessary or as desired. The added components in the filter assembly for achieving these functions in connection with filter media employed in a plurality of filter chambers, tends to increase the complexity of the filter assembly as well as its general bulkiness.

Accordingly, it is a particular object of the present invention to provide a compact configuration of a filter assembly of a type having multiple filter chambers using filter media and equipped with means for retrieving or rewinding spent filter media.

It is a more specific object of the invention to provide a filter assembly comprising a filter stack module having multiple filter chambers using filter media, a filter media supply module and an extractor and separator module for extracting filter media from the filter stack module and separating filter solids therefrom, the modules being compactly arranged in-line with each other to form a straight line path for the filter media, the extractor and separator module including first and second roller means extending perpendicularly across the filter media path for respectively reversing its direction of travel, a lateral conveyor means being arranged adjacent the first roller means for receiving filter cake solids tending to be removed from the filter media as it passes over the first roller means. A rewind module is also preferably arranged in-line with the other modules.

It is a more specific object of the invention to provide such a compact in-line filter assembly including multiple filter stack modules. Preferably, at least one extractor and separator module is arranged between one of the multiple filter stack modules and the rewind module. More preferably, an extractor and separator module is arranged downstream of each filter stack module to permit multiple use of the filter media as it is transported through the in-line modules of the filter assembly. Alternatively, only the last extractor and separator module need include extractor means. The other filter stacks may be equipped with first and second roller means and a lateral conveyor to accomplish separation with the single extractor functioning to transport the filter media through all of the multiple filter stack modules.

It is a related object of the invention to provide a similar generally in-line array of filter assembly modules but with the first and second rollers being angled slightly from an imaginary line perpendicular to the filter media travel path, a reverse travel portion of the filter media path being formed between the first and second roller means, the remaining filter media travel path being formed by substantially parallel forward travel portions. The roller means may also be a non-rotating edge. In such a configuration, the angled rollers may be effective for preventing or limiting skewing of the spent filter media while still achieving the overall compact configuration for the filter assembly.

Additional objects and advantages of the invention are made apparent in the following description having reference to the accompanying drawings.

FIG. 3 is an enlarged, fragmentary side view in elevation of a portion of the filter assembly of FIG. 1 to better illustrate construction of an extraction and separation module within the filter assembly.

FIG. 4 is a plan view of the fragmentary portion of FIG. 3, FIGS. 3 and 4 including arrows for indicating travel of filter media and filter solids in the filter assembly.

FIG. 5 is a further enlarged, fragmentary side view of a single unit of the extractor and separation module to better illustrate construction of the extractor and separation module according to the present invention.

DESCRIPTION OF THE PREFERRED EMBODIMENTS

Figure 2:
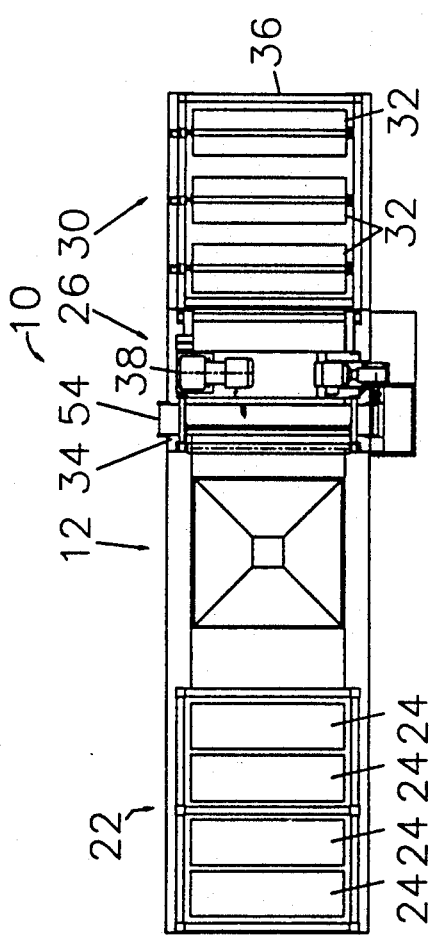
FIG. 2 is a plan view of the filter assembly of FIG. 1.
Figure 1:
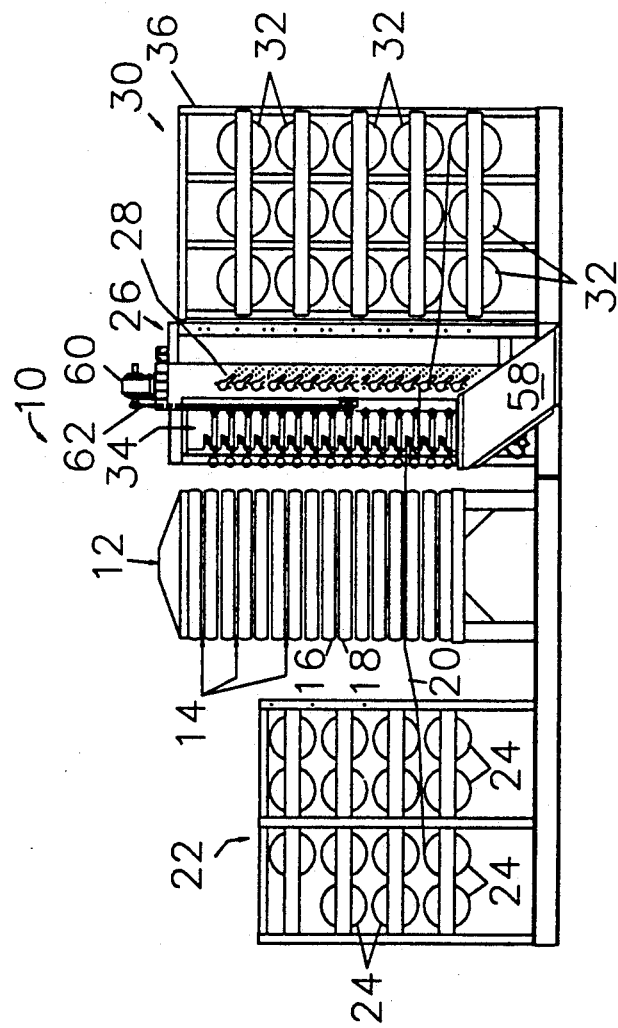
FIG. 1 is a side view in elevation of a filter assembly constructed according to the present invention.

Referring now to the drawings, and particularly to FIGS. 1 and 2, a filter assembly constructed according to the present invention is generally indicated at 10 and includes as a basic component a vertical filter stack module 12 of a type having multiple horizontally arranged filter chambers or compartments 14 each of a type having separable plates 16 and 18 for receiving filter media 20 therebetween to accomplish liquid/solids separation in an otherwise conventional manner. Accordingly, no further discussion of the filter stack module is set forth herein except to note that the filter stack illustrated in the drawings is vertically arranged. However, the filter stack could also have a horizontal or otherwise oriented arrangement. In addition, the filter stack is of at type suitable for operation either with or without a filter aid so that filter solids to be removed on the filter media 20 may include the filter aid or cake as well as contaminants removed from a liquid by the filter assembly.

Continuing with reference to FIGS. 1 and 2, the filter assembly 10 also includes a filter media supply module 22 arranged adjacent the filter stack module 12 and including rollers 24 or the like for supplying filter media to the respective filter chambers 14 in the filter stack module 12. The filter media supply module 22 is also of generally conventional construction and is not described further for purposes of the present invention.

The filter assembly 10 also includes an extractor and separator module 26 arranged opposite the filter stack module 12 from the filter media supply module 22. As indicated by its name and as described in greater detail below, the extractor and separator module 26 includes extractor means 28 for transporting the filter media from each of the filter chambers when desired and, at the same time, drawing a fresh supply of filter media 20 from the filter media supply module 22 into place within each of the filter chambers 14 of the filter stack module 12. The filter stack module 12, the filter media supply module 22 and the extractor and separator module 26 are compactly arranged in-line with each other as illustrated in FIG. 2 with reference to FIG. 1 to form a straight-line path for the filter media indicated at 20.

A rewind module 30 is arranged opposite the extractor and separator module 26 from the filter stack module 12 and includes rollers 32 or the like for taking up spent filter media as it is transported out of the filter stack module by the extractor means 28.

With the spent filter media being recovered or retrieved in the rewind module 30, the extractor and separator module 26 is also contemplated to include means for separating filter cake solids from the filter media so that it can be rewound on the rollers 32 of the rewind module 30 in a condition suitable for storage, reuse or disposal.

In connection with the rewind module 30, it is also noted that a reduced number of rollers such as those indicated at 32 may be employed if desired for receiving multiple sheets of filter media. For example, the rewind module could be supplied with only a single roller 32 if desired with the sheets of filter media passing through all of the filter chambers 14 being rewound upon the single roller.

As noted above, the extractor and separator module 26 also include respective separator assemblies 34 for removing filter cake solids from each respective sheet of filter media before it reaches the extractor means 28 and is rewound upon the rollers 32.

The separator assemblies 34 within the extractor and separator module 26 are constructed according to the present invention in order to permit an in-line configuration for the filter media supply module 22, the filter stack module 12, the extractor and separator module 26 and, preferably, the rewind module 30. More specifically, the construction of the separator assemblies 34 is selected to permit a straight line travel path for the filter media 20 through all of the modules in the filter assembly 10 as is generally indicated in FIG. 2 and illustrated in greater detail within FIG. 4. More specifically, both the in-line configuration of the modules in the filter assembly 10 and the straight line travel path of the filter media are illustrated in FIGS. 1 and 2. At the same time, it may also be seen that the extractor and separator module 26 occupies a relatively limited linear space between the filter stack module 12 and the rewind module 30. Accordingly, the substantial volume for the filter assembly 10 is taken up primarily by the filter stack module 12, the filter media supply module 22 and the rewind module 30. As described in greater detail below, the substantial volume of the extractor and separator module is occupied by the extractor means 28. Accordingly, the separator assemblies of the present invention add only slightly to the overall volume of the filter assembly. In any event, it may be seen that the construction of the present invention permits the filter assembly 10 to be of very compact design and, as viewed in FIG. 2, the in-line configuration of the filter assembly further permits multiple filter assemblies (not shown) to be arranged in closely spaced, side-by-side relation.

Before referring to FIGS. 3 and 4 of the drawings, it is also noted that only one sheet of filter media 20 is illustrated in FIG. 1. In accordance with the preceding description, it is obvious that similar sheets of filter media 20 are also supplied to the other filter chambers 14. However, all but the one sheet of filter media 20 have been omitted in FIG. 1 in order to more clearly illustrate other features of the filter assembly.

Referring now to FIGS. 3 and 4, only a single sheet of filter media 20 is again illustrated for purposes of clarity. It is also more clearly illustrated in FIG. 3 that the plates 16, 18 forming the filter chambers 14 are separated or in a condition suitable for transport or replacement of the filter media 20. It is of course to be understood that the filter plates are tightly engaged with each other during filtering operation.

The construction of the filter stack module 12 is completely set forth above with reference to FIGS. 1 and 2. As illustrated in FIGS. 3 and 4, the rewind module 30 includes the multiple rollers 32 supported upon a suitable framework 36. Otherwise, the construction and operation of that module is described above with reference to FIGS. 1 and 2.

Turning to the extractor and separator module 26, the extractor means 28 are arranged in an array with a separate extractor means 28 associated with each filter chamber 14 and each separator assembly 34. The extractor means 28 is of a generally conventional type being adapted for engaging and extracting or transporting spent filter media from the filter stack module 12 when desired. Referring momentarily to FIGS. 1 and 2, the extractor and separator module 26 is equipped with a separate drive motor 38 arranged on a top portion of the module 26 and coupled by a suitable chain drive (not shown) with all of the extractor means or devices 28.

Continuing with reference to FIGS. 3-5, each of the separator assemblies 34 is of similar construction and includes first and second rollers 40 and 42, both of which extend perpendicularly across the travel path for the filter media 20. In FIG. 3, the filter media travel path is indicated at 44. Also in FIGS. 3 and 4, relatively heavy arrows 46 represent filter cake solids deposited upon a top surface of the filter media 20. The arrows 46 also illustrate removal of the filter solids from the filter media and lateral transport of the filter solids by the separator assemblies 34 to a suitable collection point. In FIG. 4, smaller arrows 48 represent forward travel of the filter media 20 as it approaches the separator assembly 34. Similar smaller arrows 50 also represent forward travel of the filter media after it has passed the extractor means 28 and is being taken up on one of the rollers 32.

Referring now to FIGS. 3 and 4 in combination with FIG. 5, the first roller 40 is of relatively small diameter so that the filter media is caused to turn tightly upon itself as it reverses directions over the first roller. This facilitates almost complete separation of the filter cake solids from the filter media. However, in order to ensure complete separation of the filter solids from the filter media, a wire 52 is arranged beneath the first roller 40 so that it presses the filter media against the roller. In this way, the wire 52 which also extends perpendicularly across the full travel path of the filter media serves to completely remove filter cake solids. Preferably, the wire 52 is movably mounted so that it can be retracted away from the first roller, for example, to facilitate installation of the filter media. The wire 52 could also be a transverse element such as a doctor blade.

The second roller 42 again reverses the direction of the filter media so that the filter media again travels toward the extractor means 28 and the rewind module 30. The second roller 42 is of substantially larger diameter since it is not performing a separation function. In addition, the large diameter of the second roller 42 provides a space between the first roller 40 and the filter media 20 as it travels from the second roller toward the extractor means 28.

The space thus formed beneath the first roller is occupied by a lateral conveyor 54 which also extends the full lateral or transverse dimension of the filter media in order to collect all filter cake solids removed from the filter media by the first roller 40 and the wire 52. Each of the lateral conveyors 54 is driven by a pulley 56 and thus serves to transport the filter cake solids to a chute 58 arranged on one lateral side of the extractor and separator module 26 to serve as a collection point. It is apparent that an additional conveyor or receptacle (not shown) may then be used to receive the filter cake solids from the chute 58.

All of the lateral conveyors 54 in the separator assemblies 34 are also driven by a single drive motor 60 arranged at the top of the extractor and separator module 26 while being coupled with the pulleys 56 of the lateral conveyors 54 by means of a chain drive assembly generally indicated at 62 in FIG. 1.

The method of operation for the filter assembly illustrated in FIGS. 1-6 is believed apparent from the preceding description. However, the method of operation is described briefly below in order to assure a complete understanding of the invention. In operation, the filter media 20 is initially transported through the respective filter chambers 14 of the filter stack module 12 in order to position filter media within each of the chambers. With the separable plates 16, 18, then being closed, filtering operation may be commenced in accordance with conventional practice. When sufficient filter cake solids have collected on the filter media, filtering operation is suspended, the filter cake solids are preferably dried with compressed air and the plates 16, 18 are separated to free the filter media.

The extractor means 28 are then again operated for transporting the filter media laden with filter cake solids along the travel path out of the filter chambers through the separator assemblies 34, etc.

As the filter media passes over the first roller 40, separation of the filter cake solids is initiated by the tight turn produced in the filter media. Complete removal of the filter solids is ensured by the transverse scraper wire 52. The direction of the filter media is again reversed by the second roller so that the filter media is fully transported by the extractor means 28. Suitable tensioning drives (not shown) for the rollers 32 then cause the rollers to take up the filter media as it passes from the extractor means 28.

At the same time that the spent filter media laden with filter solids is removed from the filter chambers, fresh filter media is also transported from the supply module 22 into place within the filter chambers 14. Thus, after the transport and operation step summarized above are completed, the plates 16, 18 may again be pressed against each other to close the chambers and allow continued filtering operation. Filtering operation is then continued until there is a sufficient build-up of filter cake solids at which time the above steps may again be repeated to remove the filter cake solids from the filter media, rewind the filter media in the module 30 and supply fresh filter media to the filter chambers.

Figure 6:
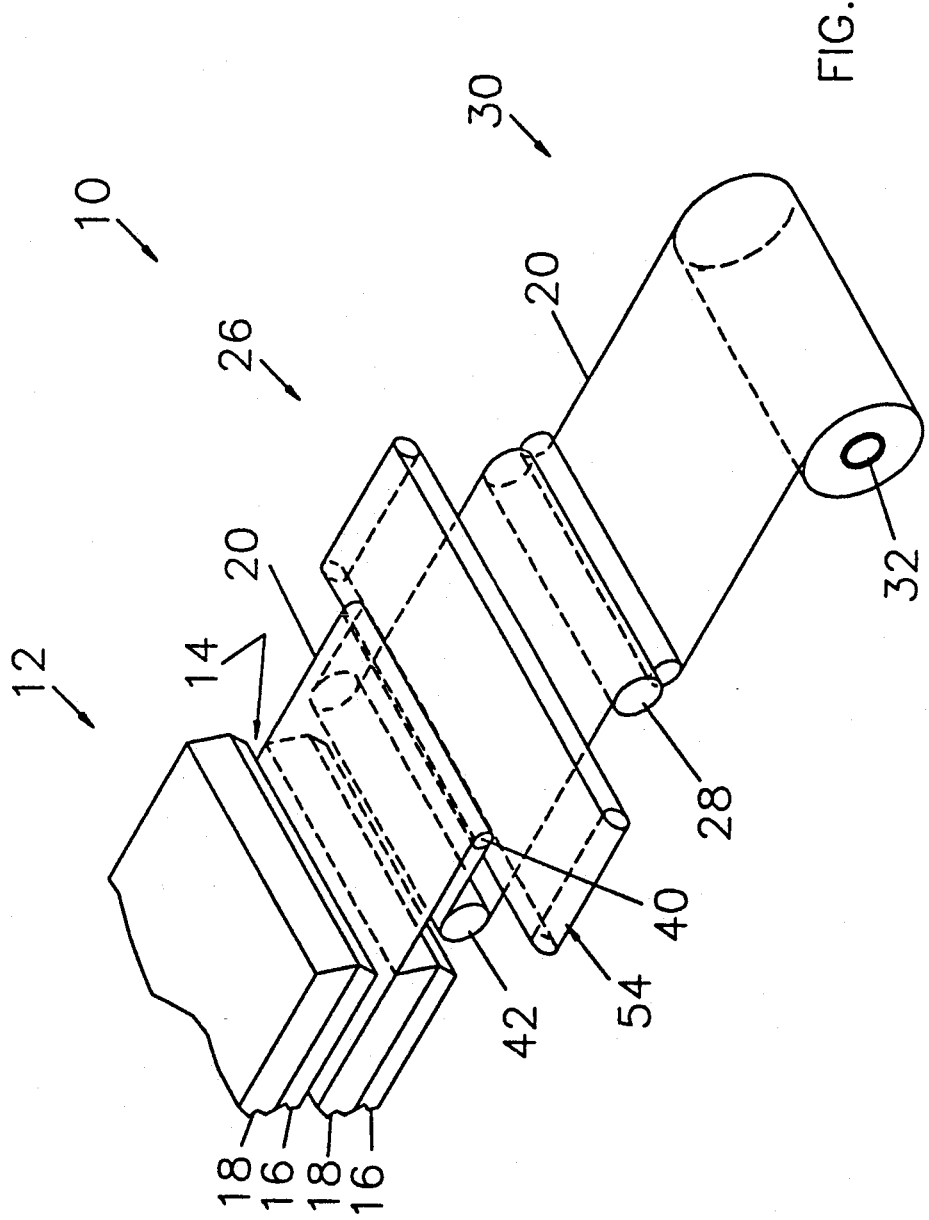
FIG. 6 is a generally schematic, pictorial representation of the filter media path through one filter chamber in the filter stack module and downstream components forming the travel path for the illustrated filter media.

The components interacting with the filter media as it leaves the filter chamber 14 in the filter stack module 12 and described above with reference to FIGS. 1-5 are illustrated in pictorial arrangement in FIG. 6 to better emphasize the compact configuration for the filter stack module 12, the extractor and separator module 26 and the rewind module 30. FIG. 6 also emphasizes the straight line travel path for the filter media through all of the filter assembly modules.

Figure 7:
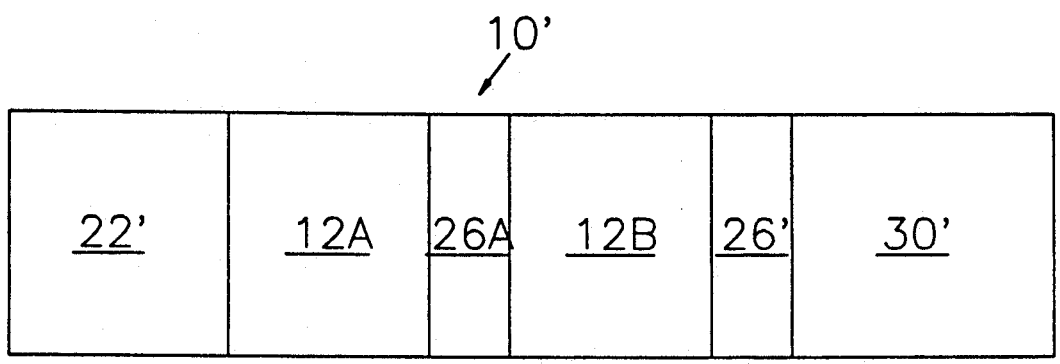
FIG. 7 is a generally schematic plan view of another embodiment of the filter assembly of the invention with multiple filter stack modules.

Another embodiment is illustrated in FIG. 7 which is generally similar to FIG. 2. Accordingly, primed numerals corresponding to those employed in FIGS. 1 and 2 are illustrated in FIG. 7.

In FIG. 7, the filter assembly 10' also includes a supply module 22' and a rewind module 30'. However, multiple filter stack modules 12A and 12B are arranged in in-line relation with each other and with the other modules 22 and 30. An extractor and separator module 26' is provided between the downstream filter stack module 12B and the rewind module 30'. The extractor and separator module 26' serves the same functions as set forth above for the extractor and separator module 26 in FIGS. 1-6.

An additional module 26A is also provided downstream of the first filter stack module 12A. The module 26A could be a similar extractor and separator module as indicate at 26'. However, since only a single array of extractor means are necessary, it is preferably contemplated that the module 26A include only an array of separator assemblies similar to those indicated at 34 in FIGS. 1-6. Minor additional apparatus might be employed, for example, such as additional rollers to assure alignment of the spent filter media from the first filter stack with filter compartments in the next filter stack.

With such a configuration, the filtering capacity of the filtering assembly is of course doubled. At the same time, filter solids can be removed from the filter media by both of the modules 26' and 26A. Thus, between filtering operations in the filter assembly 10', the filter assembly may either be fully transported toward the rewind module 30' so that fresh filter media is supplied to the filter chambers in both filter stacks 12A and 12B. However, since separator assemblies 34 are provided in both of the modules 26' and 26A, it is also possible to operate the extractor means in the module 26' so that the filter media from the first filter stack 12A, after it has filter solids removed therefrom, is positioned in the other filter stack 12B. In this manner, the filter media is employed twice in a single pass of the filter media between the supply module 22' and the rewind module 30'.

It is also of course obvious that additional filter stack modules could be employed in a filter assembly such as that illustrated at 10'. In addition, operation of the filter assembly 10' is substantially similar to that described above with the exception that the filter media may either be used once or twice during each pass through the filter assembly.

Figure 8:
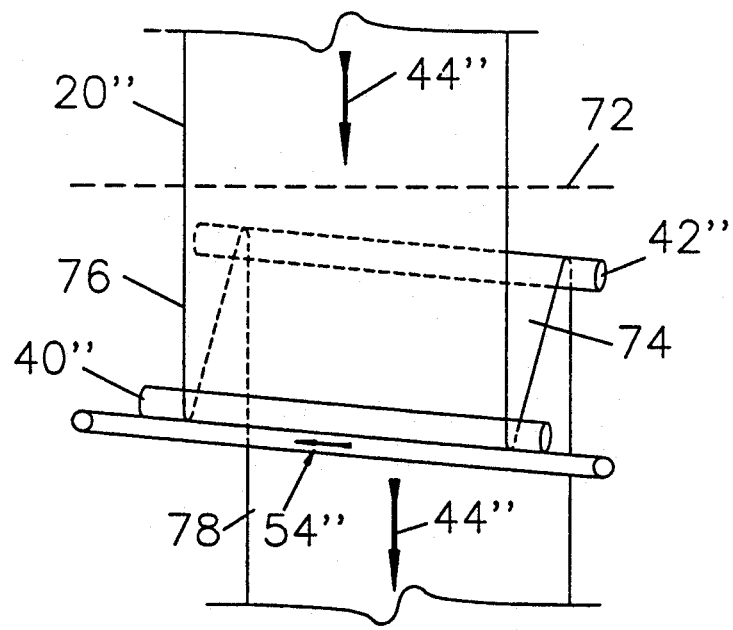
FIG. 8 is also a generally schematic, fragmentary view similar to FIG. 4 but illustrating another embodiment of the invention.
Figure 9:
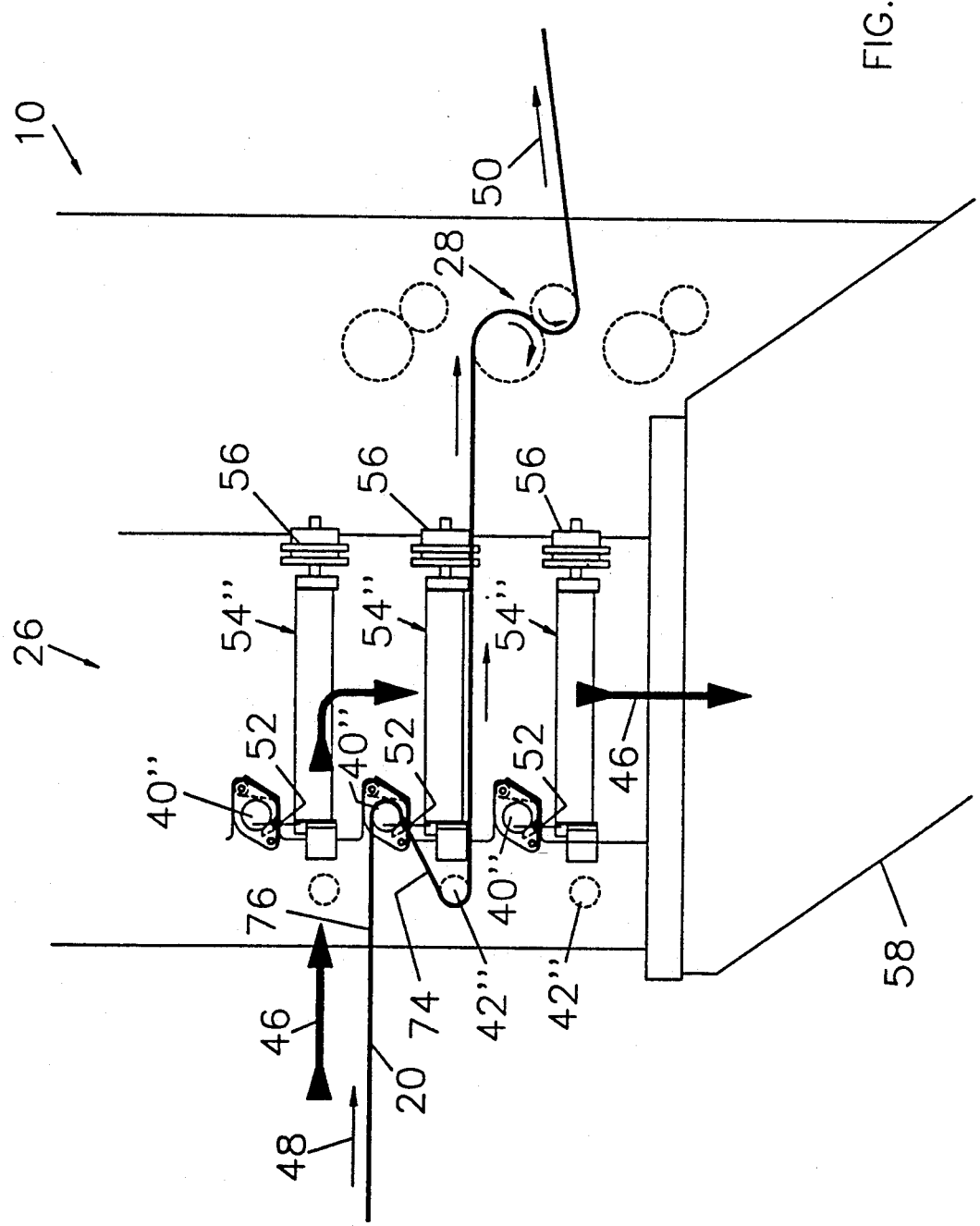
FIG. 9 is a fragmentary side view of FIG. 8.

Still another embodiment of the invention is illustrated in FIGS. 8 and 9. The embodiment of FIGS. 8 and 9 contemplates components generally similar to those described above with references to FIGS. 1-6. Accordingly, similar double primed numerals are employed to indicate the corresponding elements in FIGS. 8 and 9.

In those figures, the first and second rollers 40" and 42" are generally parallel with each other while also extending across the filter media 20" and its travel path 44". An imaginary line 72 is indicated which is perpendicular to the travel path 44".

The first and second rollers 40" and 42" are slightly angled relative to the imaginary line 72 so that a reverse travel portion 74 of the filter media between the first and second rollers is angularly offset with respect to the forward traveling portion of the filter media indicated at 76 and approaching the first roller as well as a second forward traveling portion 78 of the filter media which is moving downstream from the second roller 42". Thus, the filter media travel path 44" remains generally straight line and generally parallel for all forward traveling portions of the filter media.

The offset angle for the first and second rollers 40" and 42" may be selected according to various parameters such as to prevent skewing of the filter media as it travels over the rollers and is preferably about 5°–25° relative to the transverse line 72. Such a function for angularly arranged rollers was discussed at length for example in the Hudson patent referred to above and no further discussion is believed necessary herein. The Hudson reference is incorporated by reference herein as though set forth entirely in order to provide a complete description as to how the angular arrangement of the rollers can prevent or minimize skewing.

The first and second rollers of FIGS. 8 and 9 are preferably fixed against rotation so that they act as fixed or "deflection" edges while being of about the same size. The axis of the second roller or element is substantially lowered to make space for the transverse conveyor beneath the first roller or element. The filter media portion 74 is thus angled downwardly toward the second roller or element 42".

Otherwise, operation of the embodiment in FIGS. 8 and 9 is substantially similar to that set forth above with reference to FIGS. 1-6.

Additional modifications and variations of the invention are believed obvious in addition to those specifically set forth above. Accordingly, the scope of the present invention is defined only by the following claims which are further exemplary of the invention.

What is claimed is:

1. A filter assembly, comprising:
   multiple sheets of filter media each having a first filtration surface and a second surface;
   a vertically arranged filter stack module of multiple horizontally oriented filter chambers each having separable parallel plate means for receiving one of the sheets of filter media therebetween;
   a filter media supply module for introducing the sheets of filter media at one side of the respective filter chambers; and
   a separator module including a separator means for separating filter cake solids from the sheets of filter media;

the filter stack, filter media supply, and separator modules being compactly arranged in line with each other to form a straight-line path for the filter media as viewed from a direction normal to the first or second surfaces of the sheets of filter media, and to define an initial forward direction of travel along the straight-line path from the supply module, to the filter stack module, and toward the separator module;

the separator means including, for each filter chamber, a first roller means contacting a portion of the respective second sheet surface and extending perpendicularly across the straight-line path of the filter media for first reversing its initial forward direction of travel and tending to cause separation of the filter cake solids from the filter media, a second roller means contacting a portion of the respective first sheet surface and positioned along the first reversed direction of travel while extending perpendicularly across the straight-line path of the filter media for again reversing its first reversed direction of travel to the initial forward direction of travel, and a conveyer means lateral to the straight-line path of the filter media and adjacent the portion of the first sheet surface contacting the first roller means for receiving and transferring the separated filter cake solids to a collection point; and means for extracting the sheets of filter media from an opposite side of each filter chamber.

2. The filter assembly of claim 1 further comprising an element transverse to the straight-line path and contacting the first surface of the sheets of filter media in contact with the respective first roller means to assure separation of the filter cake solids from the filter media.

3. The filter assembly of claim 2 wherein the transverse element is a wire pressing the filter media against the first roller means.

4. The filter assembly of claim 1 comprising multiple filter stack modules arranged in-line with each other and the other modules.

5. The filter assembly of claim 4 wherein at least one separator module is arranged between one of the multiple filter stack modules and the rewind module.

6. The filter assembly of claim 4 further comprising a separator module being arranged adjacent and downstream of each filter stack module relative to the direction of travel along the path of the filter media to permit multiple use of the filter media as it is transported through the in-line filter stack modules of the filter assembly.

7. A filter assembly, comprising:

multiple sheets of filter media each having a first filtration surface and a second surface;

a filter stack module of multiple filter chambers each having separable parallel plate means for receiving one of the sheets of filter media therebetween;

a filter media supply module for introducing the sheets of filter media at one side of the respective filter chambers;

a separator module means including a separator means for separating filter cake solids from the sheet of filter media;

the filter stack, filter media supply, and separator modules being compactly arranged in-line with each other to form a straight-line path for the filter media as viewed from a direction normal to the first or second surfaces of the sheet of filter media, and to define an initial forward direction of travel along the straight-line path from the supply module, to the filter stack module, and toward the separator module;

the separator means including, for each filter chamber, a first roller means contacting a portion of the respective second sheet surface and extending perpendicularly across the straight-line path of the filter media for first reversing its initial forward direction of travel and tending to cause separation of the filter cake solids from the filter media, a second roller means contacting a portion of the respective first sheet surface and positioned along the first reversed direction of travel while extending perpendicularly across the straight-line path of the filter media for again reversing its first reversed direction of travel to the initial forward direction of travel, and a conveyor means lateral to the straight-line path of the filter media and adjacent the portion of the first sheet surface contacting the first roller means for receiving and transferring the separated filter cake solids to a collection point; and means for extracting the sheets of filter media from an opposite side of each filter chamber.

8. The filter assembly of claim 7 further comprising an element transverse to the straight-line path and contacting the first surface of each sheet of filter media in contact with the respective first roller means to assure separation of the filter solids from the filter media.

9. The filter assembly of claim 8 wherein the transverse element is a wire pressing the filter media against the first roller means.

10. The filter assembly of claim 2 further comprising multiple filter stack modules arranged in-line with each other and the other modules.

11. A filter assembly comprising:

multiple sheets of filter media each having a first filtration surface and a second surface;

a filter stack module of multiple filter chambers each having separable parallel plate means for receiving one of the sheets of filter media therebetween;

a filter media supply module for introducing the sheets of filter media at one side of the respective filter chambers;

a separator module including a separator means for separating filter cake solids from the spent portion of the sheet of filter media;

the filter stack, filter media supply, and separator modules being compactly arranged in-line with each other to form a straight-line path for the filter media as viewed from a direction normal to the first or second surfaces of the sheet of filter media, and to define an initial forward direction of travel along the straight-line path from the supply module, to the filter stack module, and toward the separator module;

the separator means including, for each filter chamber, a first roller means contacting a portion of the respective second sheet surface and extending across the straight-line path of the filter media for first reversing its initial direction of travel and tending to cause separation of the filter cake solids from the filter media, a second roller means contacting a portion of the respective first sheet surface and positioned along the first reversed direction of travel while extending across the filter media in its first reversed direction of travel for again reversing its first reversed direction of travel to the initial forward direction of travel, and a conveyor means lateral to the straight-line path of the filter media and adjacent the portion of the first sheet surface contacting the first roller means for receiving and transferring the separated filter cake solids to a collection point, the first and second rollers are substantially parallel with each other and slightly angled to form a reverse travel portion of the filter media path which is angularly offset from the forward direction of travel of the filter media path; and means for extracting the sheets of filter media from an opposite side of each filter chamber.

12. The filter assembly of claim 11 wherein the first and second rollers are angled within the range of about 5°–25° relative to an imaginary line perpendicular to the filter media path.

* * * * *